(12) United States Patent
Bonkoski et al.

(10) Patent No.: US 10,677,545 B2
(45) Date of Patent: Jun. 9, 2020

(54) METHOD OF FLOWING COOLANT THROUGH EXHAUST HEAT RECOVERY SYSTEM AFTER ENGINE SHUTOFF

(71) Applicant: Ford Global Technologies, LLC, Dearborn, MI (US)

(72) Inventors: Phillip Bonkoski, Ann Arbor, MI (US);
David Karl Bidner, Livonia, MI (US);
W. Cary Cole, Wixom, MI (US);
Jeremy L. Russell, Livonia, MI (US);
John Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 15/291,965

(22) Filed: Oct. 12, 2016

(65) Prior Publication Data
US 2018/0100711 A1    Apr. 12, 2018

(51) Int. Cl.
*F16H 57/04*    (2010.01)
*F28F 27/02*    (2006.01)
(Continued)

(52) U.S. Cl.
CPC ............ *F28F 27/02* (2013.01); *F01P 3/20* (2013.01); *F01P 7/04* (2013.01); *F01P 7/165* (2013.01); *F16H 57/0413* (2013.01); *F16H 57/0417* (2013.01); *F16H 57/0475* (2013.01); *F16H 57/0483* (2013.01); *F28D 20/0034* (2013.01); *F28D 20/02* (2013.01); *F28D 21/0003* (2013.01); *F01P 2011/205* (2013.01);
(Continued)

(58) Field of Classification Search
CPC ............. F16H 57/0483; F16H 57/0417; F16H 57/0413; F16H 57/0412; F01P 2031/30; F01P 3/20; F01P 2060/045; F02G 5/02; F02G 5/04; F01N 5/02; Y02T 10/16; F28D 21/0003; F28D 21/0014
See application file for complete search history.

(56) References Cited

U.S. PATENT DOCUMENTS 4,119,142 A * 10/1978 Margen .................. F24F 12/002
                                                  165/232
4,768,484 A    9/1988 Scarselletta
(Continued)

FOREIGN PATENT DOCUMENTS

DE            2527872 A1 *  1/1977 .............. F01P 7/165
DE      102013200022 A1 *  7/2014 .............. F01P 11/20
JP         2004278345 A  * 10/2004 ......... F16H 57/0413

OTHER PUBLICATIONS

Cary Cole, et al., "Rear Axle Lubrication Oil Temperature Control Using Exhaust Heat Recovery and a Thermal Battery," U.S. Appl. No. 14/964,332, filed Dec. 9, 2015, 43 pages.

*Primary Examiner* — Mahmoud Gimie
*Assistant Examiner* — Joshua Campbell
(74) *Attorney, Agent, or Firm* — Geoffrey Brumbaugh; McCoy Russell LLP (57) ABSTRACT

Methods and systems are provided for adjusting a flow of coolant through a coolant system including a rear axle heat exchanger. In one example, a method may include flowing coolant through the coolant system while an engine is not operating. In another example, a method may include increasing a flow of coolant to the rear axle heat exchanger while the engine is not operating when a rear axle oil temperature exceeds a threshold temperature.

20 Claims, 4 Drawing Sheets

(51) Int. Cl.
*F28D 20/02* (2006.01)
*F01P 7/16* (2006.01)
*F01P 7/04* (2006.01)
*F01P 3/20* (2006.01)
*F28D 20/00* (2006.01)
*F28D 21/00* (2006.01)
*F02G 5/02* (2006.01)
*F01P 11/20* (2006.01)
*F28D 15/00* (2006.01)

(52) U.S. Cl.
CPC ....... *F01P 2031/30* (2013.01); *F01P 2050/24* (2013.01); *F01P 2060/045* (2013.01); *F01P 2060/16* (2013.01); *F02G 5/02* (2013.01); *F16H 57/0412* (2013.01); *F16H 57/0435* (2013.01); *F28D 15/00* (2013.01); *F28D 2021/008* (2013.01); *F28D 2021/0089* (2013.01); *F28D 2021/0094* (2013.01); *F28F 2250/08* (2013.01); *Y02E 60/142* (2013.01); *Y02E 60/145* (2013.01)

(56) References Cited

U.S. PATENT DOCUMENTS

| | | | |
|---|---|---|---|
| 5,215,044 A * | 6/1993 | Banzhaf | F01P 3/20 123/41.05 |
| 5,558,055 A * | 9/1996 | Schatz | B60H 1/00492 123/142.5 R |
| 6,899,074 B1 * | 5/2005 | Carlsson | F16H 57/0412 123/196 AB |
| 6,904,875 B2 * | 6/2005 | Kilger | F01P 7/164 123/41.1 |
| 8,069,827 B2 | 12/2011 | Watanabe et al. | |
| 2003/0188937 A1 * | 10/2003 | Schneider | B60T 5/00 188/264 F |
| 2004/0216700 A1 * | 11/2004 | Hutchins | B60H 1/00314 123/41.08 |
| 2005/0028756 A1 * | 2/2005 | Santanam | F01P 7/165 123/41.1 |
| 2008/0251303 A1 * | 10/2008 | Rouaud | B60K 6/26 180/65.27 |
| 2009/0320642 A1 * | 12/2009 | Fuhrer | F28D 7/1638 74/606 A |
| 2010/0236502 A1 * | 9/2010 | Watanabe | B60K 6/48 123/41.02 |
| 2011/0220072 A1 * | 9/2011 | Seybold | F01N 5/02 123/543 |
| 2012/0137993 A1 * | 6/2012 | Kim | F01P 7/165 123/41.11 |
| 2013/0206085 A1 | 8/2013 | Adam et al. | |
| 2013/0213322 A1 * | 8/2013 | Takeuchi | F01P 3/02 123/41.1 |
| 2014/0290922 A1 * | 10/2014 | Palanchon | F16H 57/0417 165/168 |
| 2015/0267801 A1 * | 9/2015 | Bidner | F16H 57/0417 701/2 |

* cited by examiner

METHOD OF FLOWING COOLANT THROUGH EXHAUST HEAT RECOVERY SYSTEM AFTER ENGINE SHUTOFF

FIELD

The present description relates generally to methods and systems for flowing coolant through an exhaust heat storage reuse system of an engine system.

BACKGROUND/SUMMARY

An engine system, such as an engine system of a vehicle, may include one or more heat exchangers fluidly coupled to one or more coolant systems. While an engine of the engine system is in an operational mode, a temperature of components within the engine system may increase. Coolant flowing through the coolant loops may absorb thermal energy from the engine and other components of the engine system, and may transfer the thermal energy to the heat exchangers in order to reduce the temperature of the engine and other components. When the engine is adjusted from an operational mode to a non-operational mode, a flow rate of coolant within the coolant systems may be reduced, resulting in an accumulation of coolant at the heat exchangers and within coolant lines of the coolant systems. Residual thermal energy from the heat exchangers and components of the engine system may then increase the temperature of the accumulated coolant above a boiling temperature of the coolant and cause the coolant to boil, which may result in coolant leaking from the coolant systems and/or degradation of the heat exchangers.

To address the problem of residual thermal energy within the engine system, an example method is shown in U.S. Pat. No. 8,069,827, wherein an electric water pump is mounted in an engine compartment and is driven by a drive component after the engine is stopped in order to reduce a likelihood of coolant temperature increasing above the boiling temperature.

However, the inventors herein have recognized potential issues with such systems, including an absence of a method to prevent boiling of coolant in coolant systems outside of the engine compartment, such as a cooling system of a rear axle of a vehicle. Additionally, while such systems may reduce a likelihood of coolant boiling, thermal energy from the coolant is dissipated by the coolant system, thereby wasting energy that may be of use to the engine system during an engine cold-start. For example, a powertrain in a conventional rear wheel drive vehicle includes a rear axle or differential system that may include axle members and gear sets, transmitting power from a drive shaft to the axle members to propel the vehicle. The rear axle gear sets may be lubricated by lubricating oil to ensure smooth operation of the rear axle differential. Viscosity and other fluid properties of the lubrication oil are a function of temperature and affect the efficiency and performance of the rear axle system and thus the vehicle. The rear axle lubricating oil may be less viscous with increasing temperature and may be more viscous with decreasing temperature. For example, at engine cold start the lubricating oil may be cold and hence, more viscous than desired. Conversely, for example, at high engine load the rear axle lubricating oil may be over-heated and may be less viscous than desired. To minimize friction loss and to reduce wear of the rear axle gears, which may result in reduced fuel efficiency, it is desirable to monitor the rear axle lubrication oil temperature and to maintain the lubrication oil temperature within a specified temperature range for optimal lubrication of the rear axle gears while the engine is operating. It is also desirable to increase the rear axle lubrication oil temperature quickly during an engine cold-start in order to bring the rear axle lubrication oil temperature into the specified temperature range.

In one example, the issues described above may be addressed by a method comprising: flowing coolant through a coolant system while an engine is not operating, while adjusting a flow rate of the coolant through a rear axle heat exchanger (RAHX) in response to a rear axle oil temperature. In this way, coolant flows through the rear axle heat exchanger of the coolant system while the engine is not operating in order to reduce a likelihood of the coolant boiling.

As one example, the coolant system includes the rear axle heat exchanger, an exhaust gas heat exchanger, and a thermal storage vessel. While the engine is not operating, a flow rate of coolant through the exhaust gas heat exchanger is adjusted in response to an exhaust gas heat exchanger fluid outlet temperature, and a flow rate of coolant through the thermal storage vessel adjusted in response to a temperature of the thermal storage vessel. In this way, the likelihood of the coolant boiling is decreased by transferring thermal energy away from at least one of the rear axle heat exchanger or the exhaust gas heat exchanger and into the coolant. The temperature of the coolant is thereby increased, and the coolant may flow through the thermal storage vessel in order to transfer the thermal energy from the coolant to the thermal storage vessel, thereby storing the thermal energy within the thermal storage vessel. The stored thermal energy may be retained for later use, such as during an engine cold-start, in order to warm the rear axle lubrication oil to minimize friction loss and reduce wear of the rear axle gears.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
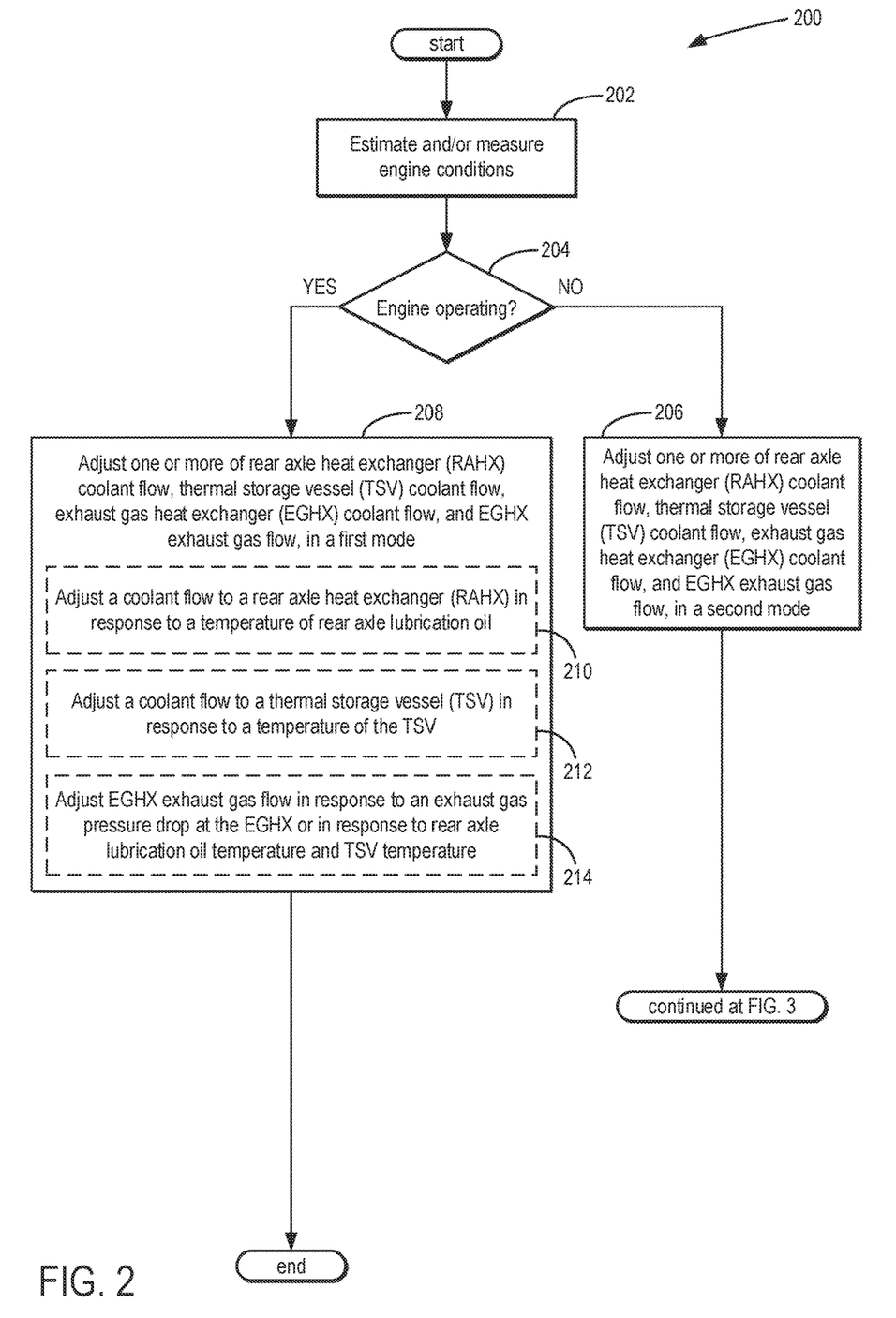
FIG. 2 shows a method of adjusting coolant flow through a coolant system in a first mode when an engine is operating, and in a second mode when the engine is not operating.
Figure 3:
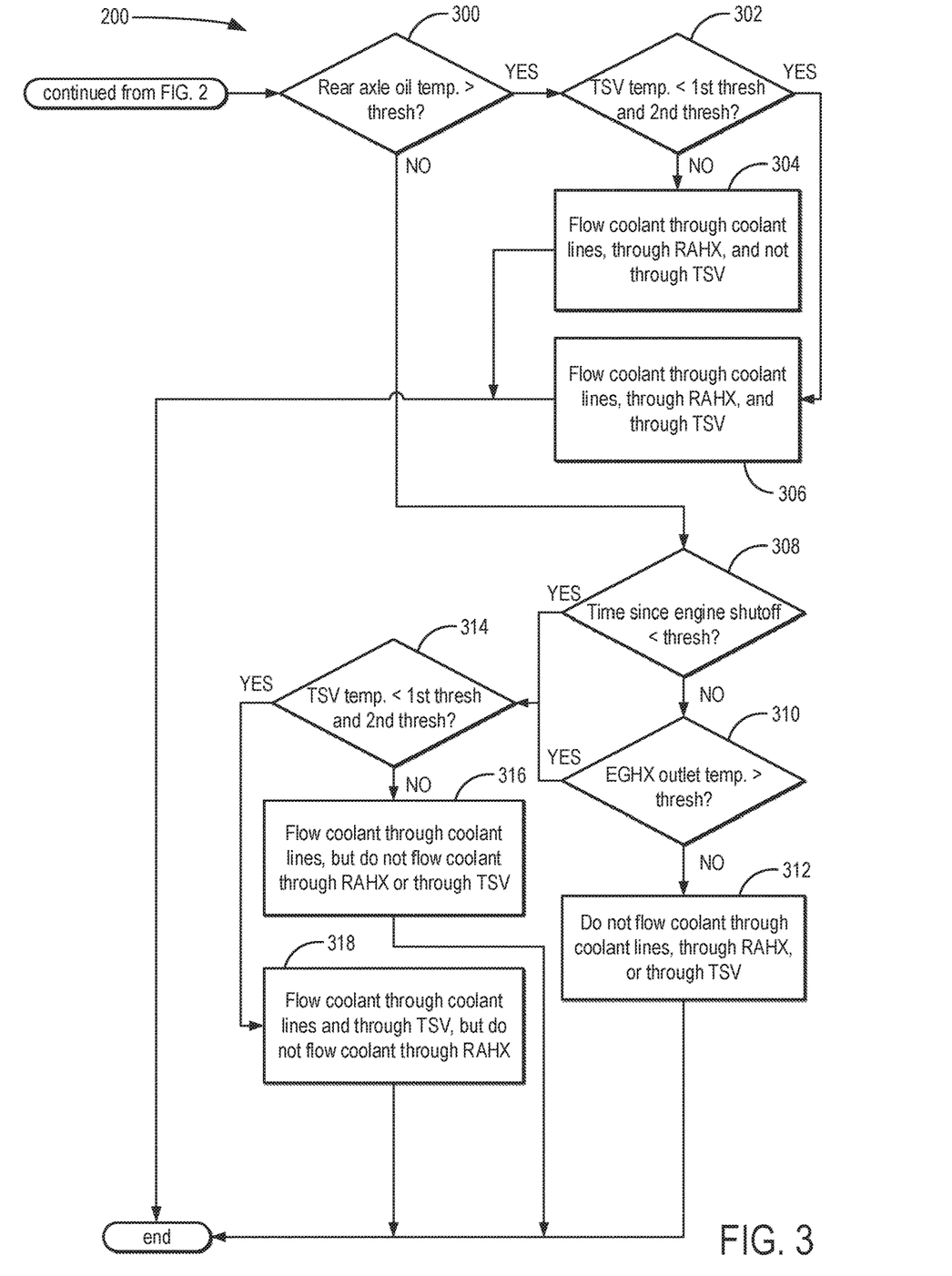
FIG. 3 shows a continuation of the method of FIG. 2, including adjusting coolant flow through the coolant system in the second mode when the engine is not operating.
Figure 4:
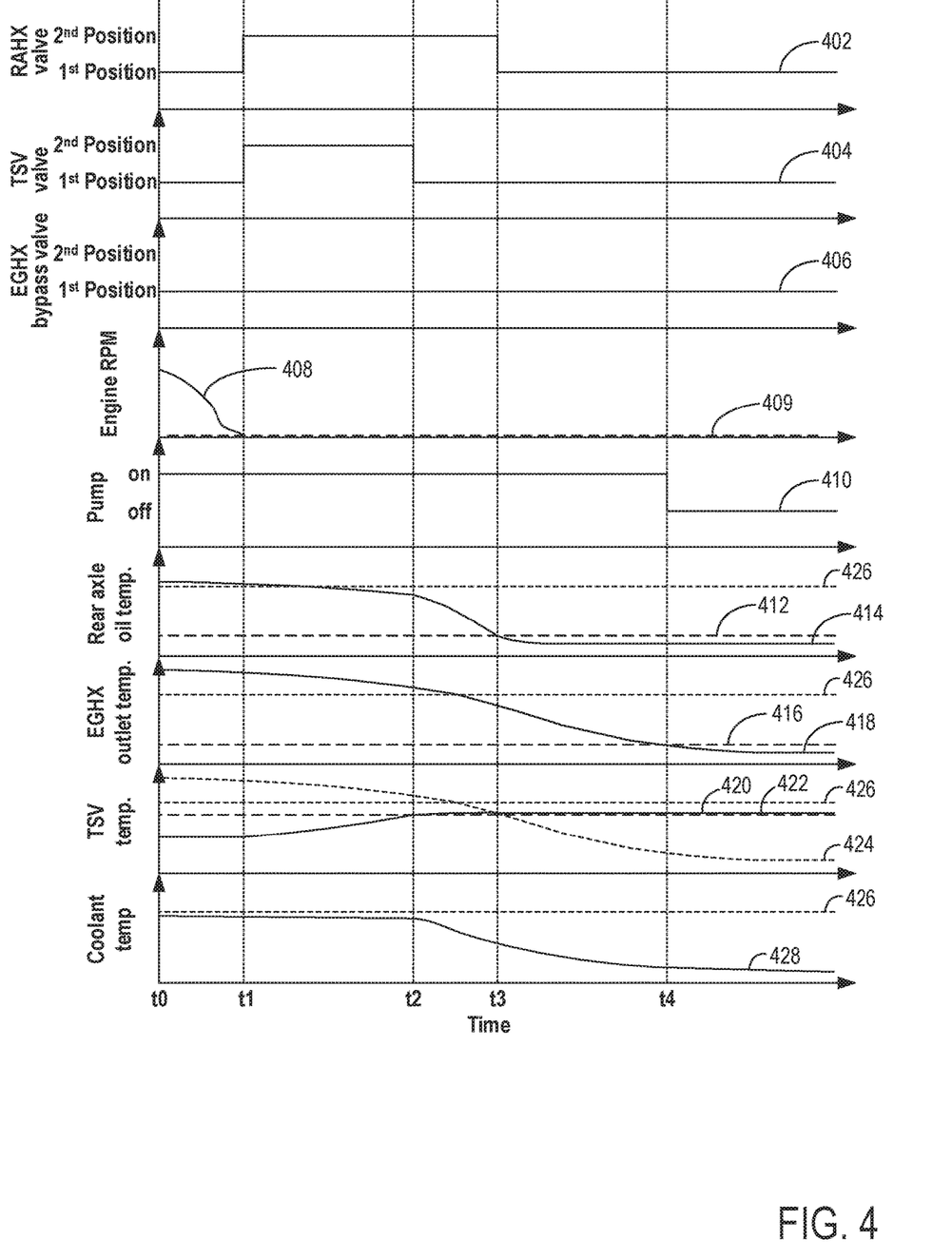
FIG. 4 illustrates example plots showing operation of a pump and position of valves of the coolant system when the coolant system adjusts from the first mode to the second mode.

The following description relates to systems and methods for flowing coolant through a coolant system of a rear axle of an engine system. A coolant system of a rear axle, such as the coolant system shown by FIG. 1, may include an EGHR system. The EGHR system may include an exhaust gas heat exchanger (EGHX) coupled with an exhaust passage of the engine system and a coolant line of the coolant system, a rear axle heat exchanger (RAHX) coupled with the coolant line and a rear axle of the engine system, a thermal storage vessel (TSV) coupled with the coolant line, and a coolant pump configured to flow coolant through the coolant line of the coolant system. The coolant system may operate in a first mode while the engine is operating (e.g., running), and may operate in a second mode while the engine is not operating (e.g., while the engine is at rest), as shown by FIG. 2. While the coolant system is operating in the second mode, a controller of the engine system may actuate valves of the coolant system in order to adjust a flow of coolant through the coolant system in response to rear axle lubrication oil temperature, TSV temperature, and EGHX temperature, as shown by FIG. 3. In one example, the controller may adjust the flow of coolant through the coolant system after engine shut-off in order to reduce a likelihood that the temperature of the coolant exceeds a boiling temperature. An example operation of the coolant system before and after engine shut-off is shown by FIG. 4.

Figure 1:
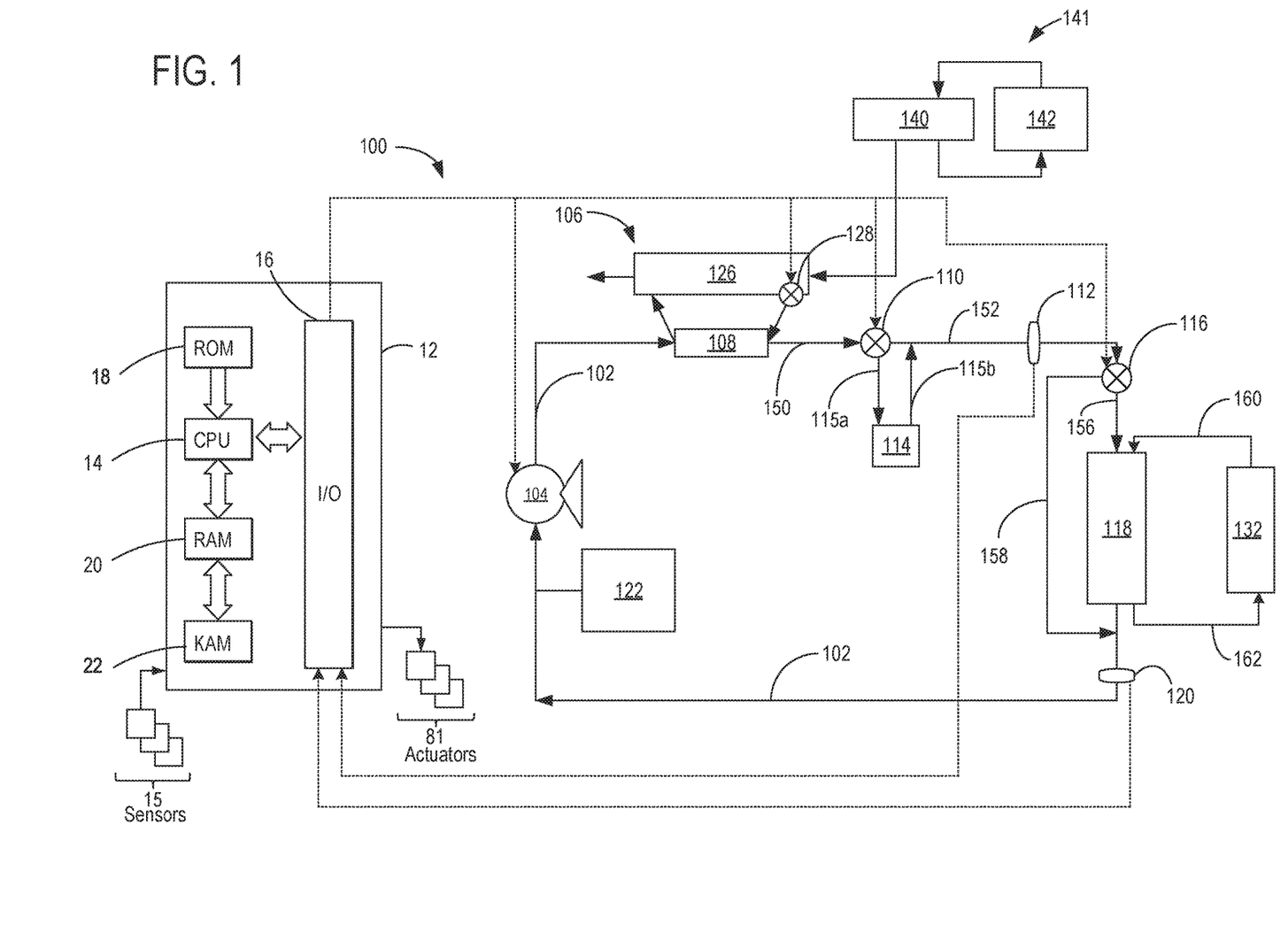
FIG. 1 shows an example of a coolant system including a coolant loop coupled to an exhaust gas heat recovery and storage system, and to a rear axle heat exchanger.

FIG. 1 shows an example of a coolant system 100 including an exhaust gas heat storage and recovery (EGHR) system 106 with valve-regulated coolant flow through a coolant loop, which may be included in an engine system 14L In the embodiment of the coolant system 100 shown by FIG. 1, coolant (e.g., water, propylene glycol, ethylene glycol, etc.) is circulated via coolant line 102 by a coolant pump 104. In one example, the coolant pump 104 may be electrically driven, via an alternator or battery (not shown) of the engine system 141, for example. In a further example, the coolant pump 104 may be mechanically driven, via an engine 140, for example. The direction of coolant flow in the coolant line 102 is indicated by arrows.

The coolant system 100 couples the coolant line 102 to the EGHR system 106, with the EGHR system 106 including a thermal storage vessel (TSV) 114, an exhaust gas heat exchanger (EGHX) 108, and a rear axle heat exchanger (RAHX) 118. The RAHX 118 may warm differential lubricant (also referred to as rear axle lubrication oil) at a rear axle 132 of a vehicle in which the coolant system 100 is installed.

The direction of coolant flow along the coolant line 102 and the associated systems may be regulated by one or more three-way valves. In one embodiment, the flow of coolant downstream of the EGHX 108 is regulated by a first three-way valve 110. The first three-way valve 110 may regulate the flow of coolant to the TSV 114. For example, an actuator (not shown) of the first three-way valve 110 may receive an electric signal from a controller 12 (described below) of the engine system 141 to move the first three-way valve 110 into a fully opened position, a fully closed position, or a plurality of positions between fully opened and fully closed relative to one or more coolant lines of the coolant system 100. The first three-way valve 110 includes an inlet for receiving coolant flow from a first portion 150 of coolant line 102, and two separate and distinct outlet conduits, with a first outlet adapted to deliver coolant to a second portion 115a of coolant line 102, and a second outlet adapted to deliver coolant to a third portion 152 of coolant line 102. The first portion 150 is fluidly coupled to both of the EGHX 108 and the first three-way valve 110 and extends from the EGHX 108 to the first three-way valve 110. The second portion 115a is fluidly coupled to the first three-way valve 110 and the TSV 114 and extends between the first three-way valve 110 and the TSV 114. The third portion 152 is fluidly coupled to the first three-way valve 110 and a second three-way valve 116, and extends between the first three-way valve 110 and the second three-way valve 116.

In a first example of actuation of the first three-way valve 110 (which may herein be referred to as a partial bypass position of the first three-way valve 110), the controller 12 may move the first three-way valve 110 into a fully opened position relative to the first portion 150 of the coolant line 102, a partially opened position relative to the third portion 152, and a fully opened or partially opened position relative to the second portion 115a. In this configuration, coolant may flow from the first portion 150 into each of the second portion 115a and the third portion 152, with an amount of coolant flowing into the second portion 115a adjustable by adjusting an amount of opening of first three-way valve 110 relative to second portion 115a, and an amount of coolant flowing into the third portion 152 adjustable by adjusting an amount of opening of first three-way valve 110 relative to the third portion 152. In a second example of actuation of the first three-way valve 110 (which may herein be referred to as an active position of the first three-way valve 110), controller 12 may move the first three-way valve 110 into a fully opened position relative to the first portion 150, a fully closed position relative to the third portion 152, and a fully opened position relative to the second portion 115a. In this configuration, coolant may flow from the first portion 150 into the second portion 115a, but not from the first portion 150 into the third portion 152. In a third example of actuation of the first three-way valve 110 (which may herein be referred to as a bypass position of the first three-way valve 110), controller 12 may move the first three-way valve 110 into a fully opened position relative to the first portion 150, a fully closed position relative to the second portion 115a, and a fully opened position relative to the third portion 152. In this configuration, coolant may flow from the first portion 150 into the third portion 152, but may not flow from the first portion 150 into the second portion 115a.

The flow of coolant through the RAHX 118 may be regulated by second three-way valve 116, positioned upstream of the RAHX 118 relative to the coolant pump 104. Similar to the first three-way valve 110 described above, an amount of opening of the second three-way valve 116 may be adjusted by the controller 12. The second three-way valve 116 includes an inlet for receiving coolant flow from a third portion 152 of coolant line 102, and two separate and distinct outlet conduits, with a first outlet adapted to deliver coolant to a fifth portion 156 of coolant line 102, and a second outlet adapted to deliver coolant to a sixth portion 158 of coolant line 102. The third portion 152 is fluidly coupled to the first three-way valve 110 and the second three-way valve 116 as described above. The fifth portion 156 is fluidly coupled to the second three-way valve 116 and the RAHX 118, and extends between the second three-way valve 116 and the RAHX 118. The sixth portion 158 is fluidly coupled to the second three-way valve 116 and a location along the coolant line 102 downstream of the RAHX 118 relative to a flow of coolant from the coolant pump 104.

In a first example of actuation of the second three-way valve 116 (which may herein be referred to as a partial bypass position of the second three-way valve 116), the controller 12 may move the second three-way valve 116 into a fully opened position relative to the third portion 152 of the coolant line 102, a partially opened position relative to the fifth portion 156, and a fully opened or partially opened position relative to the sixth portion 158. In this configuration, coolant may flow from the third portion 152 into each of the sixth portion 158 and the fifth portion 156, with an amount of coolant flowing into the sixth portion 158 adjustable by adjusting an amount of opening of second three-way valve 116 relative to sixth portion 158, and an amount of coolant flowing into the fifth portion 156 adjustable by adjusting an amount of opening of second three-way valve 116 relative to the fifth portion 156. In a second example of actuation of the second three-way valve 116 (which may herein be referred to as an active position of the second three-way valve 116), controller 12 may move the second three-way valve 116 into a fully opened position relative to the third portion 152, a fully closed position relative to the sixth portion 158, and a fully opened position relative to the fifth portion 156. In this configuration, coolant may flow from the third portion 152 into the fifth portion 156, but not from the third portion 152 into the sixth portion 158. In a third example of actuation of the second three-way valve 116 (which may herein be referred to as a bypass position of the second three-way valve 116), controller 12 may move the second three-way valve 116 into a fully opened position relative to the third portion 152, a fully closed position relative to the fifth portion 156, and a fully opened position relative to the sixth portion 158. In this configuration, coolant may flow from the third portion 152 into the sixth portion 158, but may not flow from the third portion 152 into the fifth portion 156.

The coolant line 102 may be fluidically coupled to a degas bottle/tank 122. The coolant after degassing in the degas tank may be available in the coolant line 102 connecting to the coolant pump 104 for further recirculation. A rear axle 132 may be lubricated with rear axle lubrication oil, which may flow through the RAHX 118 in order to be in a heat exchange relationship with the coolant at the RAHX 118, as indicated by first oil line 160 and second oil line 162. In other words, the RAHX 118 may transfer thermal energy from the coolant to the rear axle lubrication oil when a temperature of the coolant is greater than a temperature of the rear axle lubrication oil. Similarly, the RAHX 118 may transfer thermal energy from the rear axle lubrication oil to the coolant when a temperature of the rear axle lubrication oil is greater than a temperature of the coolant. Although the RAHX 118 permits the transfer of thermal energy between the coolant and the rear axle lubrication oil, the coolant and the rear axle lubrication oil are separated from each other within the RAHX 118 and do not mix.

Engine 140 (in one example, an internal combustion engine) emits hot exhaust gases through an exhaust system using exhaust pipes. The coolant system 100 is brought into heat exchange relation with the exhaust gas to scavenge heat from the exhaust gas for storage in the TSV 114. For example, the EGHR system 106 shown by FIG. 1 includes EGHX 108 capable of transferring heat from a flow of exhaust gas from the engine 140 to the coolant within coolant line 102. While EGHX 108 may transfer thermal energy from the exhaust gas to the coolant within coolant line 102, the exhaust gas and coolant are separated within EGHX 108 and do not mix. The exhaust gas stream may be exhaust gas from a diesel engine, a gasoline engine, or other suitable engine. In one example, the exhaust gas flows through the EGHX 108 at an exhaust passage 126. The exhaust passage 126 may receive exhaust gas from an exhaust manifold of the engine or other exhaust component. In other examples, the EGHX 108 may receive exhaust gas from another suitable source, as from the exhaust manifold or directly from one or more cylinders. Further, in some examples EGHX 108 may recover exhaust heat via coolant flow from the cylinder head or cylinder block. Engine 140 may be cooled by an engine coolant system 142 including at least one pump, radiator, corresponding coolant lines, and/or other components. Coolant in engine coolant system 142 may flow through one or more coolant jackets of the engine. Coolant in engine coolant system 142 may be maintained separately from coolant in coolant line 102, at least in some examples.

The EGHR system 106 recovers heat from the flow of exhaust gas and transfers the heat to the coolant flowing through the coolant line 102 through the EGHX 108. The hot exhaust gas may be routed from the exhaust passage 126 to the EGHX 108 through an exhaust bypass valve 128. The exhaust bypass valve 128 may be controlled by the controller 12 in response to feedback from a temperature sensing device, which may sense the temperature of the exhaust gasses. In other words, an actuator of exhaust bypass valve 128 may receive an electric signal from controller 12 in order to adjust an amount of opening of the exhaust bypass valve 128. The exhaust bypass valve 128 may be moved into a fully opened position, a fully closed position, or a plurality of positions between fully opened and fully closed. The controller 12 may signal to actuate the exhaust bypass valve 128 at a predetermined exhaust gas temperature in order to increase the amount of opening of the exhaust bypass valve 128, thereby increasing an amount of exhaust gases diverted from the exhaust passage 126 to the EGHX 108 for heat exchange with the coolant. The amount of opening of exhaust bypass valve 128 may be decreased in order to reduce the flow of the exhaust gas to the EGHX 108 when heat exchange is no longer desired, such as when exhaust gas temperature is below a threshold temperature, or when a temperature of TSV 114 is above a threshold temperature (as described below). The hot exhaust gasses may pass through the EGHX 108, which may transfer thermal energy from the hot exhaust gas to the coolant in coolant line 102, coupled to the EGHX 108. The cooled exhaust gas (e.g., gas exiting the EGHX 108 after the heat exchange with the coolant through the EGHX 108) may be delivered back to the exhaust passage 126 and then directed to downstream components of the engine system 141 (and in some examples, directed to atmosphere).

In general, a heat exchanger offers additional resistance to the exhaust gas flowing through the exhaust system, leading to a pressure drop. This pressure drop adds to the backpressure of the exhaust system, which is to be kept low to achieve good engine performance. The pressure drop across the EGHX 108 of the coolant system 100 may be monitored directly or indirectly, and may be relayed to the controller controlling the exhaust bypass valve 128. In one example, the pressure drop signal may be obtained by directly measuring the pressure drop by a pressure sensor positioned at the EGHX 108. In another example, the pressure drop may be extrapolated from other parameters, such as exhaust gas flow rate and exhaust gas temperature, which are already known to be monitored in vehicles during engine operation. One example the exhaust gas mass flow may be calculated based on intake air mass flow and an amount of injected fuel into engine 140, which in turn allows for the calculation of a pressure drop across EGHX 108. Another example includes calculation of exhaust gas mass flow based on engine speed. Other ways of indirectly determining the pressure drop across EGHX 108 could be used as well. Depending on the pressure drop across EGHX 108, the controller 12 may adjust the amount of opening of exhaust bypass valve 128. In one example, when the pressure drop across the EGHX is relatively high (e.g. above a threshold amount), the amount of opening of exhaust bypass valve 128 may be reduced to decrease flow of exhaust gasses through the EGHX 108. In another example, the exhaust bypass valve 128 may allow only part of the exhaust gas to flow through EGHX 108, and the remaining exhaust gas may be routed through the exhaust passage 126. The threshold pressure drop may depend on various factors including engine type and specific hardware, and in some examples may be relatively low (e.g., three kPa or less). As such small pressure drops may be difficult for pressure sensors to detect, the pressure drop estimations described above may provide for accurate estimations, at least in some examples.

TSV 114 is configured store excess thermal energy from coolant flowing through the second portion 115a of coolant line 102. In one example, TSV 114 may store heat in a phase-change material (PCM) that absorbs heat when changing state from solid to liquid and releases heat when changing state from liquid to solid, and may be insulated to reduce dissipation of heat stored therein. In another example, TSV 114 may include an insulated tank for storing heated coolant for later use. In an example, TSV 114 may be insulated via a vacuum jacket. In one example, in order to store thermal energy within the TSV 114, the TSV 114 may receive coolant via second portion 115a at a first temperature, and may output the coolant via fourth portion 115b at a second temperature, with the second temperature being lower than the first temperature. In another example, the TSV 114 may provide the stored thermal energy back to the coolant line 102 via fourth portion 115b of coolant line 102. For example, instead of decreasing the temperature of the coolant as described above, the TSV 114 may instead increase a temperature of coolant being output to fourth portion 115b relative to a temperature of coolant flowing into the TSV 114 via second portion 115a. In other words, the coolant flowing into TSV 114 may absorb thermal energy from the TSV 114 (e.g., via the PCM or hot coolant stored in the TSV 114 as described above) such that a temperature of the coolant is increased.

The coolant system 100 may be coupled to and regulated by input from multiple sensors. In one embodiment, the coolant system 100 may include a first temperature sensor 112 and a second temperature sensor 120 for sensing the temperature of the coolant in the coolant line 102. In one embodiment, the temperature sensor 112 may be positioned in the coolant line 102 downstream of the EGHX 108 and the TSV 114 (e.g., between third portion 152 and second three-way valve 116). The second temperature sensor 120 may be placed on the coolant line downstream of the RAHX 118 (e.g., between RAHX 118 and the coolant pump 104). The temperature sensors 112 and 120 may be electronically coupled to the controller 12, and may be configured to send a signal indicating the temperature of the coolant thereto.

Controller 12 is shown in FIG. 1 as a microcomputer, including microprocessor unit 14, input/output ports 16, an electronic storage medium for executable programs and calibration values shown as non-transitory read only memory chip 18 in this particular example for storing executable instructions, random access memory 20, keep alive memory 22, and a data bus. Controller 12 may receive various signals from sensors 15 coupled within the coolant system, in addition to those signals previously discussed (e.g., temperature sensor 112 and temperature sensor 120), such as coolant flow rate sensors, pressure sensors, etc. Additionally, engine system 141 may include additional sensors not shown, such as a TSV temperature sensor coupled to TSV 114, an EGHX temperature sensor and/or pressure sensor coupled to EGHX 108, an RAHX temperature sensor coupled to RAHX 118, a pump rate sensor coupled to coolant pump 104, etc. Controller 12 may comprise a single unit, or controller 12 may be comprised of multiple units in communication with each other. In one example, controller 12 may be the same controller that controls various aspects of engine function, such as fuel injection. In other examples, controller 12 may be separate from the engine controller, but may be configured to receive signals from the engine controller, such as exhaust gas flow rate, exhaust gas temperature, etc. The controller 12 receives signals from the various sensors of FIG. 1 and employs the various actuators, including actuators 81 and others previously described, of FIG. 1 to adjust system operation based on the received signals and instructions stored on a memory of the controller. As an example, the controller 12 may receive the signal from the temperature sensor 112 and determine if the sensed temperature of the coolant is less than, equal to, or greater than a pre-defined temperature. The controller 12 then signals the actuator of the first three-way valve 110, based on the determination that the temperature of the coolant is less than, equal to, or greater than the pre-defined temperature, to adjust the amount of opening of first three-way valve 110 to direct the flow of the coolant along one or more of a fluid flow path towards the RAHX 118 or to a second fluid flow path to the TSV 114. For example, the controller may determine a control signal to send to the actuator of the first three-way valve 110, such as a pulse width of the signal being determined based on a determination of the coolant temperature. The coolant temperature may be based on a measured coolant temperature, or determined based on operating conditions such as exhaust gas flow through the EGHX 108. The controller may determine the pulse width through a determination that directly takes into account a determined coolant temperature, such as increasing the pulse width with increasing coolant temperature. The controller may alternatively determine the pulse width based on a calculation using a look-up table with the input being coolant temperature and the output being pulse-width. As another example, the controller may make a logical determination (e.g., regarding a position of three-way valve 110, for example) based on logic rules that are a function of coolant temperature. The controller may then generate a control signal that is sent to the actuator of the three-way valve 110. As described above, the amount of opening (e.g., position) of first three-way valve 110 may be controlled by an actuator, such as a solenoid, stepper motor, etc., configured to receive commands from the controller 12.

Similarly, the controller 12 may receive the signal from the temperature sensor 120, sensing the coolant temperature downstream of the RAHX 118, and may determine if the sensed temperature of the coolant is less than, equal to, or greater than a pre-defined temperature. The control module may then signal the actuator of the second three-way valve 116 to adjust the amount of opening of the second three-way valve 116 to direct the flow of the coolant along one or more of a fluid flow path to the RAHX 118 for heat exchange or to a second fluid flow path bypassing the heat exchanger, as illustrated in the schematic in FIG. 1. As described above, the amount of opening (e.g., position) of second three-way valve 116 may be controlled by an actuator, such as a solenoid, stepper motor, etc., configured to receive commands from the controller.

The controller 12 may be configured to estimate various operating parameters of the coolant system 100. In one example, the controller 12 may estimate the coolant flow rate in coolant line 102 based on the input of the temperature sensor 120 at the outlet of the RAHX 118 and based on the position of first three-way valve 110 and second three-way valve 116 upstream of the TSV 114 and the RAHX 118, respectively. The controller 12 may estimate the fluid outlet temperature at the EGHX 108 based on exhaust gas temperature and the exhaust gas flow rate and based on the coolant flow rate. The EGHX 108 pressure drop estimation may be made by the controller 12 based on exhaust gas temperature and exhaust gas flow rate. The controller 12 may be configured to estimate TSV 114 internal temperature and potential TSV 114 fluid outlet temperature based on coolant flow rate and a comparison of an estimated TSV 114 inlet temperature and a measured TSV 114 outlet temperature by the temperature sensor 112. The rear axle lubrication oil temperature may be estimated by the controller 12 based on coolant flow rate and based on input from the temperature sensor 120 at the RAHX 118 outlet. In this way, by relying on estimation of various coolant system parameters, the number of sensors in the system may be reduced, thus reducing system cost and complexity.

Further, in some examples, coolant pump 104 may be controlled by controller 12. Coolant pump 104 may be controlled to be on or off, and in some examples may be controlled to have variable displacement, thus adjusting coolant flow rate in coolant line 102. In another example, controller 12 may adjust a pump speed of coolant pump 104 in order to adjust a coolant flow rate through the coolant system 100.

Turning now to FIG. 2, a method 200 of adjusting coolant flow through a coolant system (e.g., such as the coolant system 100 shown by FIG. 1) is shown, with the coolant system operating in a first mode when an engine (e.g., engine 140 shown by FIG. 1) is operating, and in a second mode when the engine is not operating. Instructions for carrying out method 200 and the rest of the methods included herein may be executed by a controller (e.g., such as controller 12 shown by FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. As referred to herein, when an adjustment occurs "while" a condition is true, one example of such operation is where the adjustment is made via an actuator controlled by the controller in response to a determination by the controller of that condition. Alternatively, or additionally, the adjustment and condition are both present at the same instance and the adjustment may be responsive to the condition. In still another example, the adjustment and condition are both present concurrently.

At 202, the method includes estimating and/or measuring engine conditions. In one example, the estimation and/or measurement of engine conditions may be based on one or more outputs of various sensors in the engine system and/or operating conditions of the engine system (e.g., such as various temperature sensors, pressure sensors, etc., as described above). As an example, engine conditions may include engine speed and load (e.g., torque output), rate of engine load increase, coolant temperature, coolant flow rate, fuel pressure, pedal position, fuel injector nozzle opening times, mass air flow rate, turbine speed, compressor inlet pressure, emission control device temperature, rear axle lubrication oil temperature, etc.

The method continues from 202 to 204 where the method includes determining whether the engine is operating. In one example, the determination of whether the engine is operating may be performed by the controller (e.g., controller 12 shown by FIG. 1) based on the estimation and/or measurement of engine conditions described above with reference to 202. For example, when an estimated and/or measured revolutions per minute (RPM) of the engine is less than a threshold RPM (e.g., a minimum RPM corresponding to operation of the engine), the engine may be determined to be in a non-operational mode. In one example, for an internal combustion engine, the non-operational mode may correspond to a mode in which a fuel and air mixture is not being combusted within any of the engine cylinders. In another example, for a hybrid-electric vehicle in which a motion of the vehicle results at least partially from energization of an electric motor, the non-operational mode may correspond to a mode in which the electric motor is not energized, the engine is not combusting a fuel/air mixture, and the vehicle is not in motion. Similarly, when the estimated and/or measured engine RPM is greater than the threshold RPM, the engine may be determined to be in an operational mode (e.g., the fuel/air mixture is being combusted by the engine cylinders and/or the electric motor of the hybrid-electric vehicle is being energized).

If the engine is determined to be operating at 204, the method continues to 208 where the method includes adjusting one or more of a rear axle heat exchanger (RAHX) coolant flow, a thermal storage vessel (TSV) coolant flow, an exhaust gas heat exchanger (EGHX) coolant flow, and an EGHX exhaust gas flow, in a first mode. In one example, the RAHX, TSV, and EGHX may be similar to the RAHX 118, EGHX 108, and TSV 114 shown by FIG. 1 and described above. In the first mode, the flows described above may be adjusted in response to temperatures and pressures at the RAHX, TSV, and/or EGHX. For example, at 210, the method includes adjusting coolant flow to the RAHX in response to a temperature of the rear axle lubrication oil (and therefore, a temperature of the RAHX). At 212, the method includes adjusting coolant flow to the TSV in response to a temperature of TSV. At 214, the method includes adjusting exhaust gas flow through the EGHX in response to an exhaust gas pressure drop at the EGHX, or in response to rear axle lubrication oil temperature and TSV temperature.

During 208, the controller may receive signals from specified components of the rear axle coolant system of a vehicle, such as the coolant system 100 shown by FIG. 1. The controller may control the functional mode of each component of the coolant system based on the signals received from the rear axle coolant system. The rear axle coolant system controlled at 208 may be the coolant system 100 illustrated in FIG. 1, including the coolant line 102 coupled to the coolant pump 104, the EGHX 108, the TSV 114, and the RAHX 118. The coolant system 100 also includes the exhaust bypass valve 128, the first three-way valve 110, and the second three-way valve 116. As described above with reference to FIG. 1, the exhaust bypass valve 128 may be controllable to a first position, where the exhaust bypass valve bypasses exhaust gas around the EGHX and to a second position, where the exhaust bypass valve directs the exhaust gas to the EGHX. The first three-way valve 110 may be controllable to a first position, where the first three-way valve 110 directs coolant flow to bypass the TSV, and to a second position, where the first three-way valve 110 directs the coolant flow to the TSV. The second three-way valve 116 may be controllable to a first position, where the second three-way valve 116 directs coolant flow to bypass the RAHX, and to a second position, where the second three-way valve 116 directs coolant to flow through the RAHX. The coolant system may also include the temperature sensor 112 downstream of the TSV 114 and the temperature sensor 120 downstream of the RAHX 118, as illustrated in FIG. 1. The controller controlling the coolant system at 208 may be the controller 12 of FIG. 1.

In a first example of the first mode, a temperature of the rear axle lubrication oil is greater than a first threshold temperature, while a temperature of the TSV may be less than the temperature of the rear axle lubrication oil. As a result of the temperature of the rear axle lubrication oil exceeding the first threshold temperature, a temperature of the RAHX may also be increased above the first threshold temperature. In response to the temperature of the RAHX at 210, the controller adjusts the position of the second three-way valve in order to flow coolant to the RAHX to decrease the temperature of the RAHX. Additionally, because the temperature of the TSV is less than the temperature of the rear axle lubrication oil, the controller adjusts the position of the first three-way valve at 212 to flow coolant to the TSV in order to increase the temperature of the TSV (e.g., in order to store thermal energy within the TSV as described above with reference to FIG. 1). In this example, flowing exhaust gas to the EGHX is undesirable since the exhaust gas flow may increase the EGHX temperature, which would then result in an increase in temperature of the coolant flowing through the EGHX (and therefore, the coolant flowing to the RAHX). Because the rear axle lubrication oil temperature exceeds the first threshold temperature (which may correspond to an overheated temperature of the rear axle lubrication oil), the controller may adjust a position of the exhaust bypass valve at 214 in order to decrease the flow of exhaust gas to the EGHX in order to reduce an amount of heating of the RAHX by the EGHX via the coolant flow.

In a second example of the first mode, the temperature of the rear axle lubrication oil is greater than the first threshold temperature, while the temperature of the TSV may be greater than the temperature of the rear axle lubrication oil. As a result of the temperature of the rear axle lubrication oil exceeding the first threshold temperature, the temperature of the RAHX may also be increased above the first threshold temperature. In response to the temperature of the RAHX at 210, the controller adjusts the position of the second three-way valve in order to flow coolant to the RAHX to decrease the temperature of the RAHX. Additionally, because the temperature of the TSV is greater than the temperature of the rear axle lubrication oil, the controller adjusts the position of the first three-way valve at 212 to decrease the flow of coolant to the TSV in order to reduce a likelihood of increasing the temperature of the RAHX due to coolant flowing from the TSV. In other words, because the temperature of the TSV is greater than the temperature of the RAHX, flowing coolant through the TSV and to the RAHX may increase the temperature of the RAHX. In this example, because the rear axle lubrication oil temperature exceeds the first threshold temperature (which may correspond to an overheated temperature of the rear axle lubrication oil), further heating of the RAHX is undesirable. Therefore, the controller reduces the amount of hot coolant flowing from the TSV to the RAHX. Additionally, flowing exhaust gas to the EGHX is undesirable since the exhaust gas flow may increase the EGHX temperature, which would then result in an increase in temperature of the coolant flowing through the EGHX (and therefore, the coolant flowing to the RAHX). As a result, the controller may adjust a position of the exhaust bypass valve at 214 in order to decrease the flow of exhaust gas to the EGHX in order to reduce the amount of heating of the RAHX by the EGHX via the coolant flow.

In a third example of the first mode, the temperature of the rear axle lubrication oil is greater than a second threshold temperature, with the second threshold temperature being different from the first threshold temperature. In one example, the second threshold temperature may be a normal operating temperature of the rear axle lubrication oil, and when the rear axle lubrication oil is colder than the second threshold temperature (e.g., when the temperature of the rear axle lubrication oil is below the second threshold temperature), the rear axle lubrication oil may be more viscous than desired for rear axle lubrication. In this example, however, the temperature of the rear axle lubrication oil is above the second threshold temperature and the viscosity is therefore not greater than desired. As a result, at 210, the controller adjusts the position of the second three-way valve in order to decrease the flow of coolant to the RAHX. By decreasing the flow of coolant to the RAHX, an amount of cooling of the RAHX is reduced, thereby reducing an amount of cooling of the rear axle lubrication oil so that the rear axle lubrication oil remains above the second threshold temperature. In this example, the temperature of the TSV is below a third threshold temperature. In one example, the third threshold temperature may be a designated operating temperature of the TSV, such as a temperature desirable for storage of thermal energy (as described above with reference to FIG. 1). In order to increase the temperature of the TSV, the controller at 212 adjusts the position of the first three-way valve in order to increase the flow of coolant to the TSV. In this example, an exhaust gas pressure drop at the EGHX is less than a threshold pressure drop. In one example, the threshold pressure drop may correspond to an amount of pressure drop at which engine performance is reduced. As a result, the controller at 214 adjusts the position of the exhaust gas valve to increase the flow of exhaust gas to the EGHX, thereby increasing the temperature of the coolant. The increased temperature of the coolant increases an amount of thermal energy stored by the TSV. In other words, by bypassing the RAHX and flowing coolant through the EGHX toward the TSV, a temperature of the TSV may be increased.

In a fourth example of the first mode, the temperature of the rear axle lubrication oil is less than the second threshold temperature. As a result, the rear axle lubrication oil may be more viscous than desired for rear axle lubrication. Additionally, in this example, the temperature of the TSV is greater than the temperature of the rear axle lubrication oil and greater than the temperature of the EGHX, while a pressure drop at the EGHX is less than the threshold pressure drop. In response, at 210 the controller adjusts the position of the second three-way valve in order to increase the flow of coolant to the RAHX, at 212 the controller adjusts the position of the first three-way valve in order to increase the flow of coolant to the TSV, and at 214 the controller adjusts the position of the exhaust bypass valve to increase the flow of exhaust gas to the EGHX. By flowing coolant to the RAHX and to the TSV while flowing exhaust gas through the EGHX in response to the temperature of the rear axle lubrication oil being below the second threshold temperature and the TSV temperature being greater than both of the rear axle lubrication oil temperature and the EGHX temperature, the rear axle lubrication oil may be heated by the coolant. In other words, as the coolant flows through the EGHX and the TSV, the temperature of the coolant may increase, thereby increasing the temperature of the RAHX as the coolant flows through the RAHX. The increased temperature of the RAHX then increases the temperature of the rear axle lubrication oil.

In a fifth example of the first mode, the temperature of the rear axle lubrication oil is less than the second threshold temperature. As a result, the rear axle lubrication oil may be more viscous than desired for rear axle lubrication. Additionally, in this example, the temperature of the TSV is less than at least one of the temperature of the rear axle lubrication oil or the temperature of the EGHX, while a pressure drop at the EGHX is less than the threshold pressure drop. In response, at 210 the controller adjusts the position of the second three-way valve in order to increase the flow of coolant to the RAHX, at 212 the controller adjusts the position of the first three-way valve in order to decrease the flow of coolant to the TSV, and at 214 the controller adjusts the position of the exhaust bypass valve to increase the flow of exhaust gas to the EGHX. By increasing the flow of coolant to the RAHX and decreasing the flow of coolant to the TSV while flowing exhaust gas through the EGHX, the rear axle lubrication oil may be heated by the coolant. In other words, as the coolant flows through the EGHX, the temperature of the coolant may increase, thereby increasing the temperature of the RAHX as the coolant flows through the RAHX. The increased temperature of the RAHX then increases the temperature of the rear axle lubrication oil. In this example, the temperature of the TSV is not high enough to increase the temperature of the coolant, and so the flow rate of coolant to the TSV is decreased.

In a sixth example of the first mode, the temperature of the rear axle lubrication oil is less than the second threshold temperature. As a result, the rear axle lubrication oil may be more viscous than desired for rear axle lubrication. Additionally, in this example, the temperature of the TSV is greater than the temperature of the rear axle lubrication oil, while the pressure drop at the EGHX is greater than the threshold pressure drop (as described above with reference to FIG. 1). In response, at 210 the controller adjusts the position of the second three-way valve in order to increase the flow of coolant to the RAHX, at 212 the controller adjusts the position of the first three-way valve in order to increase the flow of coolant to the TSV, and at 214 the controller adjusts the position of the exhaust bypass valve to decrease the flow of exhaust gas to the EGHX. By increasing the flow of coolant to the RAHX and increasing the flow of coolant to the TSV while decreasing the flow of exhaust gas through the EGHX, a temperature of the coolant may be increased by the TSV in order to heat the rear axle lubrication oil. In other words, as the coolant flows through the TSV, the temperature of the coolant may increase, thereby increasing the temperature of the RAHX as the coolant flows from the TSV and through the RAHX. The increased temperature of the RAHX then increases the temperature of the rear axle lubrication oil. In this example, because the exhaust gas pressure drop at the EGHX is greater than the threshold pressure drop, the thermal energy stored in the TSV is used to heat the rear axle lubrication oil (e.g., by heating the RAHX).

While the first through sixth examples of the first mode described above provide various methods of flowing coolant through the coolant system in response to operating conditions (e.g., temperature and/or pressure) of the TSV, RAHX, and EGHX, it should be appreciated that method 200 may include alternate methods of flowing coolant through the coolant system in response to the operating conditions. In one example, if the controller detects that one or more valves and/or the coolant pump are not functioning correctly (e.g., are not responsive to signals from the controller), the controller may disable the rear axle coolant system (e.g., not pump coolant through the coolant system with the coolant pump), or the controller may pump coolant through the coolant system with the coolant pump but may not flow coolant to either of the TSV or the RAHX. In another example (which may be referred to herein as a default operation of the coolant system), coolant may flow through the coolant system via operation of the coolant pump, but the valves of the coolant system and EGHX may be in positions such that exhaust gas does not flow through the EGHX and coolant does not flow through either of the RAHX or the TSV.

If the engine is determined to be not operating at 204, the method continues to 206 where the method includes adjusting one or more of the RAHX coolant flow, the TSV coolant flow, the EGHX coolant flow, and the EGHX exhaust gas flow, in a second mode.

FIG. 3 shows a continuation of the method 200 shown by FIG. 2, wherein the portion of the method 200 shown by FIG. 3 occurs while the engine is not operating (e.g., in response to a determination that the engine is in a non-operational mode as described above with reference to 204). In other words, the portion of the method 200 shown by FIG. 3 occurs while the coolant system is operating in the second mode, as described above with reference to 206, and the engine is at rest.

The method continues from 206 (shown by FIG. 2) to 300 (shown by FIG. 3), where the method includes determining whether the rear axle oil temperature is greater than a threshold temperature. For example, the threshold temperature may be based on a boiling temperature of the coolant within the coolant system. In one example, the threshold temperature may be adjusted by the controller based on a flow rate of coolant through the RAHX. In other words, while a flow rate of coolant through the RAHX is high, the threshold temperature may be increased due to a decreased likelihood of coolant boiling. Similarly, when the flow rate of coolant through the RAHX is low, the threshold temperature may be decreased due to an increased likelihood of coolant boiling.

If the rear axle oil temperature is determined to be above the threshold temperature at 300, the method continues to 302 where the method includes determining whether the TSV temperature is less than both of a threshold temperature T1 and a threshold temperature T2. In one example, the threshold temperature T1 may be based on a maximum storage temperature of the TSV (e.g., a maximum desired temperature of the TSV, such as a temperature at which an entirety of the PCM described above with reference to FIG. 1 is liquid), and the threshold temperature T2 may be based on a fluid outlet temperature of the EGHX. For example, the fluid outlet temperature of the EGHX may be based on a temperature of a coolant outlet of the EGHX coupled to portion of the coolant system positioned downstream of the coolant pump and upstream of the TSV, such as the first portion 150 shown by FIG. 1 and described above. The controller may compare a sensed and/or estimated value of the TSV temperature (as described above with reference to sensors 15 of engine system 141) to both of the threshold temperature T1 and the threshold temperature T2 in order to determine whether the TSV temperature is greater than the threshold temperature T1 or the threshold temperature T2.

If the TSV temperature is less than both of the threshold temperature T1 and the threshold temperature T2 at 302, the method continues to 306 where the method includes flowing coolant through the coolant lines, through the RAHX, and through the TSV. In one example, flowing coolant through the coolant lines includes pumping coolant through the coolant system via the coolant pump. In order to flow coolant through the TSV, the controller may adjust a position of a valve coupled upstream of the TSV (such as first three-way valve 110 shown by FIG. 1) to increase a flow rate of coolant to the TSV (e.g., through the second portion 115a of the coolant line shown by FIG. 1). In another example, if a flow rate of coolant to the TSV cannot be further increased at 306 (e.g., if a position of the valve coupled upstream of the TSV is already in a fully opened position relative to the TSV), the controller at 306 may instead maintain the flow rate of coolant to the TSV without adjusting the position of the valve coupled upstream of the TSV. Similarly, in order to flow coolant through the RAHX, the controller may adjust a position of a valve coupled upstream of the RAHX (such as second three-way valve 116 shown by FIG. 1) to increase a flow rate of coolant to the RAHX (e.g., through the fifth portion 156 of the coolant line shown by FIG. 1). In another example, if a flow rate of coolant to the RAHX cannot be further increased at 306 (e.g., if a position of the valve coupled upstream of the RAHX is already in a fully opened position relative to the RAHX), the controller at 306 may instead maintain the flow rate of coolant to the RAHX without adjusting the position of the valve coupled upstream of the RAHX.

If the TSV temperature is not less than both of the threshold temperature T1 and the threshold temperature T2 at 302, the method continues to 304 where the method includes flowing coolant through the coolant lines of the coolant system, through the RAHX, and not through the TSV. As described above with reference to 306, flowing coolant through the coolant lines includes pumping coolant through the coolant system via the coolant pump, and in order to flow coolant through the RAHX and not through the TSV, the controller may adjust a position of one or more valves of the coolant system. For example, in order to flow coolant through the RAHX, the controller may adjust a position of the valve positioned upstream of the RAHX (e.g., second three-way valve 116 shown by FIG. 1) in order to increase the flow rate of coolant to the RAHX, or if the valve is already in the fully opened position relative to the RAHX, the controller may maintain the flow rate of coolant to the RAHX without adjusting the position of the valve. In order to not flow coolant through the TSV, the controller may adjust a position of the valve upstream of the TSV (e.g., first three-way valve 110 shown by FIG. 1) in order to reduce an amount of opening of the valve relative to the TSV and decrease the flow rate of coolant to the TSV. In one example, the controller may decrease the amount of opening of the valve relative to the TSV until the valve is in a fully closed position relative to the TSV. By adjusting the valve to the fully closed position, the flow rate of coolant to the TSV may be stopped.

Returning to 300, if the rear axle oil temperature is determined to be not above the threshold temperature at 300, the method continues to 308 where the method includes determining whether an amount of time since engine shutoff is less than a threshold amount of time. In one example, the amount of time since engine shutoff may be an amount of time that the engine has been at rest (e.g., in the non-operational mode) since the determination at 204. The amount of time since engine shutoff may be determined by the controller based on a measured and/or estimated amount of time. For example, the controller may remain energized by a component of the engine (e.g., a battery) while the engine is at rest, and may include an internal clock or instructions for determining time. In this example, the controller records a first time when it determines that the engine is at rest at 204, and may measure and/or estimate a second time at 308. The controller may then compare a difference (e.g., an amount of time) between the first time and the second time with the threshold amount of time in order to determine whether the amount of time between the first time and the second time is less than the threshold amount of time. As described herein, engine shutoff and non-operation refers to a condition in which the engine is at rest, and the engine is not energized and/or combusting a fuel/air mixture. As such, engine shutoff is a condition of the engine and is distinct from an engine shutoff request initiated by an operator of a vehicle including the engine.

In one example, the threshold amount of time may be based on an amount of time for a temperature of coolant within the coolant system to decrease below a threshold temperature (e.g., based on a boiling temperature of the coolant) through heat exchange with the atmosphere. For example, over time, the coolant within the coolant system may decrease in temperature due to thermal radiation and heat transfer with air surrounding the coolant system. In other words, while the engine is shut off, thermal energy from the coolant within the coolant system may transfer to air surrounding the coolant system and may also radiate from the coolant system in the form of electromagnetic radiation. The coolant may continue to decrease in temperature until the temperature of the coolant is approximately the same as the temperature of the air surrounding the coolant system. The threshold amount of time, then, may be the amount of time between the first time (e.g., the time at which the engine shut off, determined at 204 and described above) and a time at which the temperature of the coolant is decreased sufficiently below a boiling temperature of the coolant through the heat exchange with the atmosphere described above. In one example, the threshold temperature of the coolant may be ten degrees Celsius below the boiling temperature of the coolant. In alternate examples, the threshold temperature may be a different temperature relative to the boiling temperature of the coolant, such as 20 degrees Celsius below the boiling temperature. As a result of the threshold amount of time depending on the threshold temperature of the coolant, the threshold amount of time may increase or decrease based on the threshold temperature. For example, when the threshold temperature is high (e.g., when the boiling temperature of the coolant is high, for example, due to an increased coolant pressure within the coolant system), the threshold amount of time may be higher (e.g., an increased amount of time). Likewise, when the threshold temperature is lower (e.g., when the boiling temperature of the coolant is low, for example, due to a decreased coolant pressure within the coolant system), the threshold amount of time may be lower (e.g., a decreased amount of time).

If the amount of time since engine shutoff is not less than the threshold amount of time at 308, the method continues to 310 where the method includes determining whether a temperature of the EGHX fluid outlet is greater than a threshold temperature. In one example, the threshold temperature of the EGHX fluid outlet may be based on the boiling temperature of the coolant. For example, the threshold temperature of the EGHX fluid outlet may be a temperature lower than the boiling temperature of the coolant, such as a temperature ten degrees Celsius below the boiling temperature.

If the temperature of the EGHX fluid outlet is not greater than the threshold temperature at 310, the method continues to 312 where the method includes not flowing coolant through the coolant lines, through the RAHX, and through the TSV. For example, at 312 the coolant pump may not pump coolant through the coolant system, and the valve coupled upstream of the TSV may be moved into a fully closed position relative to the TSV. Additionally, the valve coupled upstream of the RAHX may be moved into a fully closed position relative to both of the TSV and the RAHX. In other words, referring to the coolant system 100 of FIG. 1 as an example, the controller 12 may send signals to actuators of the first three-way valve 110 and second three-way valve 116 in order to close the first three-way valve 110 with respect to the first portion 150 and the second portion 115a of the coolant line 102, and close the second three-way valve 116 with respect to the third portion 152 and the fifth portion 156. The controller additionally sends a signal to coolant pump 104 to stop the pumping of coolant through the coolant line 102. By adjusting the first three-way valve 110, the second three-way valve 116, and the coolant pump 104 in this way, coolant does not flow through the coolant system and to each of the EGHX 108, TSV 114, and RAHX 118. Additionally, coolant does not flow from the TSV 114 to the RAHX 118 or to sixth portion 158, thereby reducing a likelihood of thermal energy transfer from the TSV 114 to the RAHX 118.

However, if the amount of time since engine shutoff is less than the threshold amount of time at 308, or if the temperature of the EGHX fluid outlet is greater than the threshold temperature at 310, the method continues to 314 where the method includes determining whether the TSV temperature is less than both of the threshold temperature T1 and the threshold temperature T2. As described above with reference to 302, the threshold temperature T1 may be based on a maximum storage temperature of the TSV (e.g., a maximum desired temperature of the TSV, such as a temperature at which an entirety of the PCM described above with reference to FIG. 1 is liquid), and the threshold temperature T2 may be based on a fluid outlet temperature of the EGHX. The controller may compare the TSV temperature to the threshold temperature T1 and the threshold temperature T2 in order to determine whether the TSV temperature is less than both of the threshold temperature T1 and the threshold temperature T2.

If the TSV temperature is less than both of the threshold temperature T1 and the threshold temperature T2 at 314, the method continues to 318 where the method includes flowing coolant through the coolant lines and through the TSV, but not flowing coolant through the RAHX. For example, the coolant pump may pump coolant through the coolant system, and the controller may send a signal to an actuator of the valve positioned upstream of the TSV (e.g., the first three-way valve 110 shown by FIG. 1) and an actuator of the valve positioned upstream of the RAHX (e.g., the second three-way valve 116 shown by FIG. 1) in order to adjust the amount of opening of each valve. As an example, the amount of opening of the first three-way valve 110 relative to the TSV may be maintained or increased in order to flow coolant to the TSV, while the amount of opening of the second three-way valve 116 relative to the RAHX may be decreased in order to reduce and/or stop the flow of coolant to the RAHX.

However, if the TSV temperature is not less than both of the threshold temperature T1 and the threshold temperature T2 at 314, the method continues to 316 where the method includes flowing coolant through the coolant lines, but not flowing coolant through the RAHX, and not flowing coolant through the TSV. For example, the coolant pump may pump coolant through the coolant system, and the controller may send a signal to the actuator of the valve positioned upstream of the TSV (e.g., the first three-way valve 110 shown by FIG. 1) and the actuator of the valve positioned upstream of the RAHX (e.g., the second three-way valve 116 shown by FIG. 1) in order to adjust the amount of opening of each valve. As an example, the amount of opening of the first three-way valve 110 relative to the TSV may be decreased in order to reduce and/or stop the flow of coolant to the TSV, while the amount of opening of the second three-way valve 116 relative to the RAHX may be decreased in order to reduce and/or stop the flow of coolant to the RAHX.

Turning now to FIG. 4, an example operation of a rear axle coolant system (such as the coolant system 100 shown by FIG. 1) of an engine is shown, with coolant flow through the coolant system adjusted according to the method 200 shown by FIGS. 2-3. In particular, FIG. 4 shows a position of an RAHX valve at 402 (e.g., a valve positioned upstream of an RAHX of the coolant system, such as the second three-way valve 116 positioned upstream of RAHX 118 shown by FIG. 1), a position of a TSV valve at 404 (e.g., a valve positioned upstream of a TSV of the coolant system, such as the first three-way valve 110 positioned upstream of TSV 114 shown by FIG. 1), a position of an EGHX bypass valve at 406 (e.g., a valve coupled between an exhaust passage and an EGHX, such as the exhaust bypass valve 128 shown by FIG. 1), an estimated and/or measured value of engine RPM at 408, an output of a coolant pump of the coolant system at 410 (e.g., such as the coolant pump 104 shown by FIG. 1), a temperature of rear axle lubrication oil at 414, a temperature of a fluid outlet (e.g., a coolant outlet as described above with reference to FIG. 3) of the EGHX at 418, a temperature of the TSV at 420, and a temperature of the coolant at 428.

Additionally, FIG. 4 shows representations of threshold engine RPM at 409, threshold rear axle oil temperature at 412, threshold EGHX fluid outlet temperature at 416, first threshold TSV temperature at 422, second threshold TSV temperature at 424, and coolant boiling temperature 426. In this example, the threshold engine RPM at 409 corresponds to the threshold engine RPM described above with reference to 204 of FIG. 2, the threshold rear axle oil temperature at 412 corresponds to the threshold temperature described above with reference to 300 of FIG. 3, the threshold EGHX fluid outlet temperature at 416 corresponds to the threshold temperature described above with reference to 310 of FIG. 3, the first threshold TSV temperature at 422 corresponds to the threshold temperature T1 described above with reference to 302 and 314, the second threshold TSV temperature at 424 corresponds to the threshold temperature T2 described above with reference to 302 and 314, and the coolant boiling temperature at 426 corresponds to a temperature at which coolant flowing through the coolant system may boil.

Between time t0 and time t1, the engine is operating. In other words, in the example of the internal combustion engine as described above with reference to FIG. 1, the engine is combusting a mixture of fuel and air in engine cylinders. As a result, the engine RPM (shown by 408) is above the threshold RPM (shown by 409). While the engine is operating (e.g., in response to a determination that the engine is running and is energized and/or combusting a fuel/air mixture), the coolant system is operating according to the first mode described above with reference to 208 shown by FIG. 2. In this example, the EGHX valve is in a first position in which exhaust gases do not flow through the valve and into the EGHX. Instead, exhaust gases flow from the engine and through an exhaust passage (e.g., exhaust passage 126 shown by FIG. 1), bypassing the EGHX. Additionally, the TSV valve is in a first position wherein coolant does not flow through the TSV valve and into the TSV. Instead, coolant flows through the TSV valve toward the RAHX valve, bypassing the TSV. Similarly, the RAHX valve is in a first position wherein coolant does not flow through the RAHX valve and into the RAHX. Instead, coolant flows through the RAHX valve and through a coolant line bypassing the RAHX (e.g., sixth portion 158 of coolant line 102 described above with reference to FIG. 1).

Due to the decreasing RPM of the engine and the position of the EGHX valve (e.g., in the first position, closed relative to the EGHX) during the time between t0 and t1, the rear axle lubrication oil temperature and the EGHX outlet temperature are each decreasing. The coolant pump is on (e.g., operating) as indicated by 410 and is flowing coolant through the coolant system. However, because the TSV valve is in the first position (e.g., closed relative to the TSV), coolant does not flow into the TSV and the temperature of the TSV remains relatively constant.

At time t1, the engine RPM 408 decreases below the threshold RPM 409. In one example, the threshold RPM may be slightly above zero, such that when the engine RPM decreases below the threshold RPM, the engine RPM is zero and the engine is at rest. In other words, when the engine is at rest, the engine is not energized, a fuel/air mixture is not combusted in any of the engine cylinders, and a vehicle including the engine is not in motion, as described above with reference to 204 of FIG. 2. When the engine RPM decreases below the threshold RPM (e.g., when the engine RPM is zero), the coolant system operates in the second mode, as described above with reference to 206 of FIG. 2. As a result, a controller (e.g., controller 12 shown by FIG. 1) compares the rear axle oil temperature 414 with the threshold rear axle oil temperature 412. Due to the rear axle oil temperature being greater than the threshold temperature at time t1, and due to the coolant system operating in the second mode as described above, at time t1 the RAHX valve is moved from the first position to a second position, with the second position corresponding to a position in which coolant flows through the RAHX valve and toward the RAHX. Additionally, the controller determines at time t1 that the TSV temperature 420 is less than both of the first threshold TSV temperature at 422 and the second threshold TSV temperature at 424. As a result, the TSV valve is moved from the first position to a second position, with the second position corresponding to a position in which coolant flows through the TSV valve and toward the TSV. Because the temperature of the rear axle lubrication oil is greater than the temperature of the TSV at time t1, as the coolant begins to flow to the TSV and the RAHX, thermal energy is transferred from the RAHX to the coolant, and the thermal energy is then transferred to the TSV. In other words, coolant flowing through the coolant system in this configuration cools the RAHX and heats the TSV due to the temperature difference between the RAHX and the TSV.

Between time t1 and time t2, the coolant pump is operating, as indicated by 410, and the engine is at rest, as indicated by 408. The EGHX fluid outlet temperature continues to decrease at 418 due to the flow of coolant through the EGHX, and the rear axle lubrication oil temperature continues to decrease at 414 due to the flow of coolant through the RAHX (e.g., due to the position of the RAHX valve at 402). As the coolant absorbs thermal energy from the EGHX and the RAHX, the coolant transfers thermal energy to the TSV, as indicated by the increasing temperature of the TSV at 420.

At time t2, the temperature of the TSV as indicated at 420 exceeds the first threshold TSV temperature 422. As a result, the controller sends a signal to the actuator of the TSV valve in order to move the TSV valve from the second position to the first position, with the second position corresponding to a position in which coolant flows to the TSV, and the first position corresponding to a position in which coolant does not flow to the TSV. Although the temperature of the TSV at time t2 is below the second threshold TSV temperature shown at 424 (e.g., the threshold temperature corresponding to the temperature of the EGHX fluid outlet temperature), as described above with reference to 302 shown by FIG. 3, if the temperature of the TSV is above either of the first threshold TSV temperature or the second threshold TSV temperature while the rear axle lubrication oil temperature is greater than the threshold rear axle oil temperature at 412 (e.g., in response to a determination that the rear axle lubrication oil temperature is greater than the threshold rear axle oil temperature), the TSV valve is moved from the second position to the first position in order to not flow coolant through the TSV.

Accordingly, between time t2 and time t3, the TSV valve remains in the first position as shown by 404. In this position, coolant does not flow to the TSV. As a result, TSV temperature increases less gradually between time t2 and t3 compared to the increase between time t1 and time t2. In one example, the gradual increase in TSV temperature between time t2 and t3 is due to residual thermal energy within coolant accumulated at the TSV. In other words, prior to time t2, coolant flows through the TSV, and after time t2, coolant does not flow through the TSV. However, due to the adjustment in the position of the TSV valve at time t2, coolant in the coolant line between the TSV valve and the TSV may accumulate within the TSV between time t2 and time t3, thereby slightly increasing the temperature of the TSV as shown by 420. Because the TSV is thermally insulated from the atmosphere as described above with reference to FIG. 1, the temperature of the TSV does not decrease between time t2 and time t3.

Meanwhile, between time t2 and time t3, coolant is flowing through the RAHX (as indicated by the RAHX valve position at 402). As a result, the temperature of the rear axle lubrication oil continues to decrease as indicated at 414 (e.g., due to heat exchange between the rear axle lubrication oil and the RAHX). Additionally, coolant continues to flow through the EGHX, and as a result, the temperature of the EGHX fluid outlet continues to decrease as indicated at 418. Additionally, as the coolant flows through the coolant system, the temperature of the coolant indicated by 428 decreases.

At time t3, the temperature of the rear axle lubrication oil as indicated at 414 decreases below the threshold rear axle oil temperature indicated at 412. Additionally, the temperature of the TSV as indicated at 420 is above both of the first threshold TSV temperature at 422 and the second threshold TSV temperature at 424, while the temperature of the EGHX fluid outlet at 418 is above the threshold EGHX fluid outlet temperature at 416 (e.g., in response to a determination that the temperature of the EGHX fluid outlet is above the threshold EGHX fluid outlet temperature). As a result, the controller sends a signal to the actuator of the RAHX valve in order to move the RAHX valve from the second position to the first position, as shown by 402, with the second position corresponding to a position in which coolant flows through the RAHX, and the first position corresponding to a position in which coolant does not flow through the RAHX. In this configuration, coolant is pumped through the coolant system by the coolant pump as indicated at 410, with the coolant flowing through the EGHX but not through the TSV and the RAHX. In one example, the configuration described above corresponds to 316 shown by FIG. 3. In other words, the rear axle lubrication oil temperature is greater than the threshold rear axle lubrication oil temperature, the EGHX fluid outlet temperature is greater than the threshold EGHX fluid outlet temperature, and the TSV temperature is greater than the first threshold TSV temperature and the second threshold TSV temperature.

Between time t3 and t4, coolant continues to flow through the coolant system due to operation of the coolant pump as indicated by 410. The coolant flows through the EGHX, thereby decreasing the temperature of the EGHX fluid outlet as shown by 418. Coolant does not flow through the RAHX, and so the temperature of the rear axle lubrication oil indicated by 414 remains relatively constant below the threshold rear axle lubrication oil temperature indicated by 412. In one example, the rear axle lubrication oil temperature indicated by 414 may be approximately a same temperature as air surrounding the RAHX. In other words, between time t3 and t4, the rear axle lubrication oil may be in thermal equilibrium with the air surrounding the coolant system. Additionally, between time t3 and t4, coolant does not flow through the TSV. As a result, the temperature of the TSV remains relatively constant, as indicated by 420, due to the TSV being thermally insulated from the air surrounding the coolant system. However, because the coolant line of the coolant system is not thermally insulated from the air, as the coolant is pumped through the coolant system, the temperature of the coolant indicated by 428 continues to decrease. In other words, between the time t3 and time t4, thermal energy of the coolant flowing through the coolant system is transferred to the air surrounding the coolant system (e.g., via heat transfer and thermal radiation as described above with reference to 308 shown by FIG. 3), thereby reducing the temperature of the coolant.

At time t4, the temperature of the EGHX fluid outlet (shown at 418) decreases below the threshold EGHX fluid outlet temperature (shown at 416). Additionally, the temperature of the TSV at 420 is above both of the first threshold TSV temperature at 422 and the second threshold TSV temperature at 424, and the temperature of the rear axle lubrication oil at 414 is below the threshold rear axle lubrication oil temperature at 412. As a result, the controller sends a signal to the coolant pump in order to stop the coolant flow through the coolant system, as indicated by the pump operation at 410. In this configuration (e.g., a configuration corresponding to 312 shown by FIG. 3), coolant does not flow through the coolant line or through each of the RAHX, EGHX, and TSV.

After time t4, the coolant system is at rest. In other words, coolant is not flowing through the coolant system, and the temperature of the rear axle lubrication oil (and therefore, the RAHX) indicated at 414 and the temperature of the EGHX indicated at 418 are each sufficiently below the coolant boiling temperature indicated at 426. The temperature of the TSV indicated at 420 remains relatively constant.

By flowing coolant through the coolant system as described above with reference to FIGS. 2-4, a likelihood of the temperature of the coolant exceeding the boiling temperature is reduced. For example, after the engine is shut off and while the engine is at rest, the coolant pump operates to flow coolant through the coolant system in order to reduce the temperature of the RAHX and the temperature of the EGHX according to the conditions described above. Additionally, the thermal energy transferred from the EGHX and RAHX to the coolant is utilized to increase the temperature of the TSV. The coolant may flow through the coolant system until the temperatures of the EGHX and the RAHX are sufficiently below the coolant boiling temperature (e.g., below their respective threshold temperatures, as described above).

The technical effect of flowing coolant through the coolant system in this way is to decrease the likelihood of coolant boiling due to coolant accumulation at the EGHX or RAHX (e.g., coolant accumulation that would result from not flowing coolant through the coolant system and allowing the coolant to remain at the EGHX and/or RAHX). The temperature of the TSV may remain increased (e.g., above the first threshold TSV temperature and/or second threshold TSV temperature) after the coolant pump has stopped flowing coolant through the coolant system due to the thermal insulation of the TSV from the air surrounding the coolant system. As a result, the TSV may increase an availability of thermal energy to the coolant system for later use, such as during an engine cold-start, in order to increase a temperature of the rear axle lubrication oil. In this way, by reducing the likelihood of coolant boiling after engine shut-off, a likelihood of degradation of components of the coolant system (e.g., the RAHX, EGHX, etc.) may be reduced. Additionally, the thermal energy from the RAHX and EGHX may be utilized at a later time via the TSV, thereby increasing an effectiveness of the coolant system toward controlling rear axle lubrication oil temperature and viscosity.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
cooling a rear axle heat exchanger (RAHX) at a rear axle of a vehicle by flowing a coolant, comprising water and maintained separate from an engine coolant, through a coolant system while an engine is not operating, while adjusting a flow rate of the coolant through the RAHX in response to a rear axle oil temperature of rear axle oil exchanged between only the RAHX and the rear axle via first and second oil lines, the coolant and the rear axle oil maintained separate from each other within the RAHX without mixing, by, responsive to a first condition, concurrently adjusting a first three-way valve and a second three-way valve to control a flow of coolant from the first three-way valve to a thermal storage vessel (TSV) and to control a flow of coolant from the second three-way valve to the RAHX, where the first three-way valve is adjustable to bypass the flow of coolant around the TSV to the second three-way valve, and where the second three-way valve is adjustable to bypass the flow of coolant around the RAHX to a coolant line coupled to an outlet of the RAHX, and, responsive to a second condition, adjusting only one of the first three-way valve or the second three-way valve.

2. The method of claim 1, wherein adjusting the flow rate of the coolant through the RAHX includes:
responsive to the rear axle oil temperature being greater than a first threshold temperature, maintaining or increasing a flow rate of the coolant from an exhaust gas heat exchanger (EGHX) through the RAHX; and
responsive to the rear axle oil temperature being less than the first threshold temperature, decreasing the flow rate of the coolant from the EGHX through the RAHX.

3. The method of claim 2, further comprising adjusting a flow rate of the coolant from the EGHX through the TSV fluidly coupled with the coolant system in response to a temperature of the TSV.

4. The method of claim 3, wherein adjusting a flow rate of the coolant through the TSV includes maintaining or increasing the flow rate of the coolant from the EGHX through the TSV while the temperature of the TSV is less than both of a second threshold temperature and a third threshold temperature.

5. The method of claim 4, wherein adjusting the flow rate of the coolant through the TSV includes decreasing the flow rate of the coolant from the EGHX through the TSV while the temperature of the TSV is greater than either of the second threshold temperature or the third threshold temperature.

6. The method of claim 5, wherein the second threshold temperature corresponds to a desired storage temperature of the TSV, and wherein the third threshold temperature corresponds to a fluid outlet temperature of the EGHX fluidly coupled with the coolant system, the EGHX fluidly coupled with the TSV via the first three-way valve and fluidly coupled with the RAHX via the second three-way valve.

7. The method of claim 6, wherein cooling the RAHX by flowing the coolant through the coolant system while the engine is not operating includes decreasing the rear axle oil temperature by maintaining or increasing a coolant pumping rate of a coolant pump fluidly coupled with the coolant system while an amount of time since engine shutoff is less than a threshold amount of time, and wherein the coolant flowing through the coolant system is maintained separate from an engine coolant system comprising a radiator.

8. The method of claim 7, wherein adjusting the flow rate of the coolant through the RAHX includes maintaining or increasing the coolant pumping rate of the coolant pump while the fluid outlet temperature of the EGHX is greater than a fourth threshold temperature, wherein the coolant pump and the coolant system are not fluidly coupled with the engine.

9. The method of claim 8, wherein adjusting the flow rate of the coolant through the RAHX includes decreasing the coolant pumping rate of the coolant pump while the amount of time since engine shutoff is greater than the threshold amount of time and the fluid outlet temperature of the EGHX is less than the fourth threshold temperature.

10. A method for a coolant system of a vehicle, comprising:
in response to vehicle engine shutoff, flowing a coolant, comprising water and maintained separate from a vehicle engine coolant, through coolant lines fluidly coupling an exhaust gas heat exchanger (EGHX) to each of a rear axle heat exchanger (RAHX) at a rear axle of the vehicle and a thermal storage vessel (TSV);
cooling the RAHX by adjusting a flow rate of the coolant from the EGHX through the RAHX in response to a rear axle oil temperature of rear axle oil exchanged directly between the RAHX and the rear axle via first and second oil lines, the coolant and the rear axle oil maintained separate from each other within the RAHX without mixing, and, responsive to a first condition, concurrently adjusting a first three-way valve and a second three-way valve to control a flow of coolant from the first three-way valve to the TSV and to control a flow of coolant from the second three-way valve to the RAHX, where the first three-way valve is adjustable to bypass the flow of coolant around the TSV to the second three-way valve, and where the second three-way valve is adjustable to bypass the flow of coolant around the RAHX to a coolant line coupled to an outlet of the RAHX, and, responsive to a second condition, adjusting only one of the first three-way valve or the second three-way valve; and
heating the TSV by adjusting a flow rate of the coolant from the EGHX through the TSV in response to a temperature of the TSV.

11. The method of claim 10, wherein flowing the coolant through the coolant lines includes at least flowing the coolant through the first three-way valve fluidly coupling the EGHX to the TSV and flowing the coolant through the second three-way valve fluidly coupling the EGHX to the RAHX, and further includes maintaining the coolant separate from a vehicle engine.

12. The method of claim 11, wherein cooling the RAHX by adjusting the flow rate of the coolant from the EGHX through the RAHX in response to the rear axle oil temperature includes maintaining or increasing the flow rate of the coolant from the EGHX through the RAHX while the rear axle oil temperature is above a first threshold temperature and decreasing the flow rate of the coolant from the EGHX through the RAHX while the rear axle oil temperature is below the first threshold temperature, and wherein the first and second three-way valves and the RAHX are not fluidly coupled with the vehicle engine.

13. The method of claim 12, wherein heating the TSV by adjusting the flow rate of the coolant from the EGHX through the TSV in response to the temperature of the TSV includes comparing the temperature of the TSV to both of a second threshold temperature and an EGHX fluid outlet temperature, and maintaining or increasing the flow rate of the coolant from the EGHX through the TSV while the temperature of the TSV is less than both of the second threshold temperature and the EGHX fluid outlet temperature, and decreasing the flow rate of the coolant from the EGHX through the TSV while the temperature of the TSV is greater than one of the second threshold temperature and the EGHX fluid outlet temperature.

14. The method of claim 13, further comprising not flowing the coolant through the coolant lines and not flowing the coolant from the EGHX through the RAHX and the TSV while an amount of time after the vehicle engine shutoff is greater than a threshold amount of time, and not flowing the coolant through the coolant lines and not flowing the coolant from the EGHX through the RAHX and the TSV while the EGHX fluid outlet temperature is less than a third threshold temperature and the rear axle oil temperature is less than the first threshold temperature.

15. A method for a rear axle coolant system of an engine, comprising:
   during engine operation:
      responsive to a first condition, recovering exhaust gas heat at an exhaust gas heat exchanger (EGHX) via a coolant comprising water in a coolant loop maintained separate from an engine coolant and storing the recovered exhaust gas heat in a thermal storage vessel (TSV); and
      responsive to a second condition, transferring heat from the TSV to rear axle lubrication oil via a rear axle heat exchanger (RAHX) at a rear axle, the rear axle lubrication oil maintained separate from the coolant and exchanged directly between the RAHX and the rear axle via first and second oil lines; and
   during engine non-operation:
      responsive to a third condition, concurrently adjusting a first three-way valve and a second three-way valve to control a flow of coolant from the first three-way valve to the TSV and to control a flow of coolant from the second three-way valve to the RAHX, where the first three-way valve is adjustable to bypass the flow of coolant around the TSV to the second three-way valve, and where the second three-way valve is adjustable to bypass the flow of coolant around the RAHX to a coolant line coupled to an outlet of the RAHX;
      responsive to a fourth condition, adjusting only one of the first three-way valve or the second three-way valve;
      responsive to a temperature of the rear axle lubrication oil, adjusting a flow of the coolant from the EGHX to the RAHX;
      responsive to a temperature of the TSV, adjusting a flow of the coolant from the EGHX to the TSV; and
      responsive to a temperature of the EGHX, adjusting a flow rate of the coolant through the coolant loop.

16. The method of claim 15, wherein the first condition comprises the temperature of the rear axle lubrication oil being above a first threshold temperature, and wherein the second condition comprises the temperature of the rear axle lubrication oil being below the first threshold temperature, while the temperature of the TSV is equal to or greater than the rear axle lubrication oil temperature.

17. The method of claim 16, wherein adjusting the flow of the coolant from the EGHX to the RAHX includes actuating the second three-way valve, wherein adjusting the flow of the coolant from the EGHX to the TSV includes actuating the first three-way valve, and wherein adjusting the flow rate of the coolant through the coolant loop includes adjusting a pump rate of a coolant pump fluidly coupled with the coolant loop.

18. The method of claim 17, wherein actuating the second three-way valve includes not adjusting an amount of opening of a coolant inlet of the second three-way valve downstream of the EGHX and the TSV and upstream of the RAHX while adjusting an amount of opening of at least one coolant outlet of the second three-way valve downstream of the EGHX and the TSV and upstream of the RAHX, and wherein actuating the first three-way valve includes not adjusting an amount of opening of a coolant inlet of the first three-way valve upstream of the RAHX and the TSV and downstream of the EGHX while adjusting an amount of opening of at least one coolant outlet of the first three-way valve upstream of the RAHX and the TSV and downstream of the EGHX.

19. The method of claim 18, wherein, during the engine non-operation, the coolant is pumped through the coolant pump until the temperature of the rear axle lubrication oil and the temperature of the EGHX are each below a boiling temperature of the coolant.

20. The method of claim 19, wherein a vehicle including the engine is a hybrid-electric vehicle, and wherein engine non-operation is defined as a condition in which an electric motor of the vehicle is not energized and the vehicle is not in motion.

* * * * *